Figure 1:
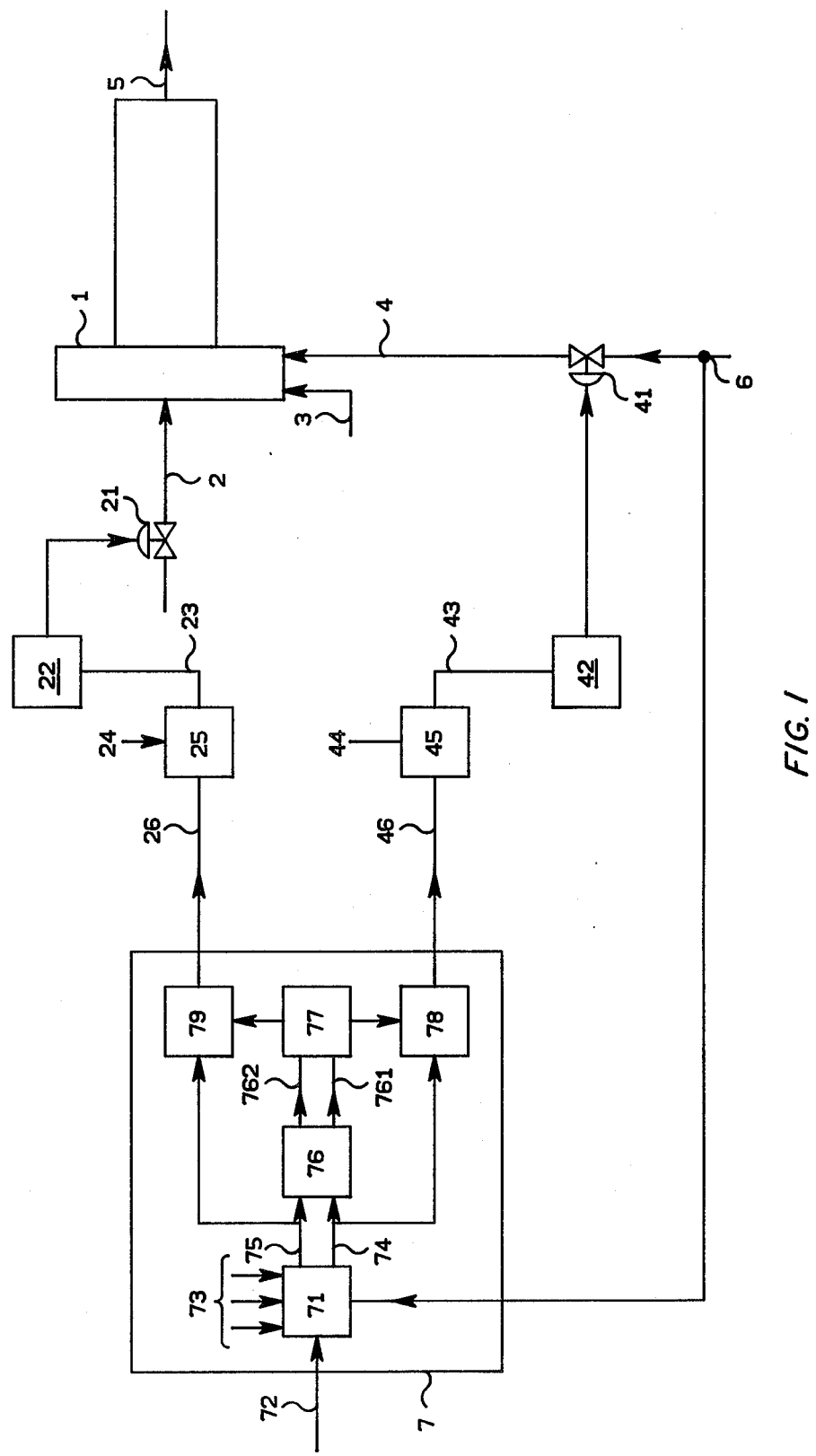

United States Patent [19]

Stacy et al.

[11] 4,436,698
[45] Mar. 13, 1984

[54] FEED FORWARD CARBON BLACK REACTOR CONTROL

[75] Inventors: Galen D. Stacy; Merle R. Likins, Jr., both of Bartlesville, Okla.

[73] Assignee: Phillips Petroleum Company, Bartlesville, Okla.

[21] Appl. No.: 401,279

[22] Filed: Jul. 23, 1982

Related U.S. Application Data

[62] Division of Ser. No. 195,710, Oct. 9, 1980, Pat. No. 4,355,016.

[51] Int. Cl.³ .......................... G05D 7/00; C09C 1/48; B01J 4/00
[52] U.S. Cl. ....................................... 422/62; 422/111; 422/150
[58] Field of Search .......................... 422/62, 111, 150; 436/55; 423/449, 450, 455, 456

[56] References Cited

U.S. PATENT DOCUMENTS

| | | | |
|---|---|---|---|
| 3,350,173 | 10/1967 | Colby et al. | 423/455 |
| 3,390,960 | 7/1968 | Forseth | 422/150 X |
| 3,471,260 | 10/1969 | Lehr et al. | 423/450 |
| 3,592,599 | 7/1971 | Gohlke et al. | 423/450 |
| 3,993,447 | 11/1976 | Buss et al. | 422/62 |
| 3,998,934 | 12/1976 | Vanderveen | 423/455 |
| 4,251,221 | 2/1981 | Austin | 422/62 X |

Primary Examiner—Arnold Turk
Assistant Examiner—Robert J. Hill, Jr.

[57] ABSTRACT

Carbon black process control system wherein in the preferred embodiment responsive to a determination of the humidity or water content in the free oxygen-containing gas flowing into the carbon black reactor two separate modes of control are calculated and a selection between the modes is made depending upon the influence each of the modes has on further properties of the overall operation. For example, the iodine number of the carbon black is controlled by either manipulating the air flow or the oil flow into the carbon black reactor to maintain the iodine number constant despite changes in the humidity and the selection between the two control modes (air flow control or oil flow control) is made in accordance with a determination of the respective conversion achieved.

1 Claim, 4 Drawing Figures

FEED FORWARD CARBON BLACK REACTOR CONTROL

This application is a division of application Ser. No. 195,710, filed Oct. 9, 1980, now U.S. Pat. No. 4,355,016.

This invention relates to the automatic control of a carbon black reactor responsive to a determination of the humidity or water content of the free oxygen-containing gas utilized in the carbon black production. The invention specifically relates to both a process and an apparatus involving such a control system.

BACKGROUND OF THE INVENTION

The production of carbon black under controlled conditions has become increasingly important in recent years. The more constant the individual parameters of the carbon black process are kept, the more reliable and predictable the carbon black properties will be. Unfortunately, a variety of carbon black process parameter variations occur which are not readily controllable economically. One of the most significant of such parameter variations is the water content of the free oxygen-containing gas such as air used during the fuel combustion for heating the carbon black feedstock to carbon black forming temperature. The water content of the air, which can also be expressed as the relative humidity of the air at a given temperature, has a significant influence on such important carbon black process parameters as conversion, production rate, iodine number, etc. Although it is possible to operate a carbon black plant with air of controlled water content, the required pretreatment of the air or the other free oxygen-containing gas utilized is frequently economically prohibitive.

It has been proposed in the prior art to control the quality of the carbon black by manipulating the hydrocarbon feed rate responsive to the water content in the free oxygen-containing gas stream. Whereas this proposal has been a significant contribution to the carbon black art, it would be desirable to have available a more flexible control system that allows further optimization of the carbon black process without sacrificing quality control of the carbon black produced.

THE INVENTION

It is thus one object of this invention to provide a control system for a carbon black production process permitting an optimization of conversion.

Another object of this invention is to provide a carbon black process utilizing such a control system.

Still a further object of this invention is to provide an apparatus for carrying out the process.

Figure 2:
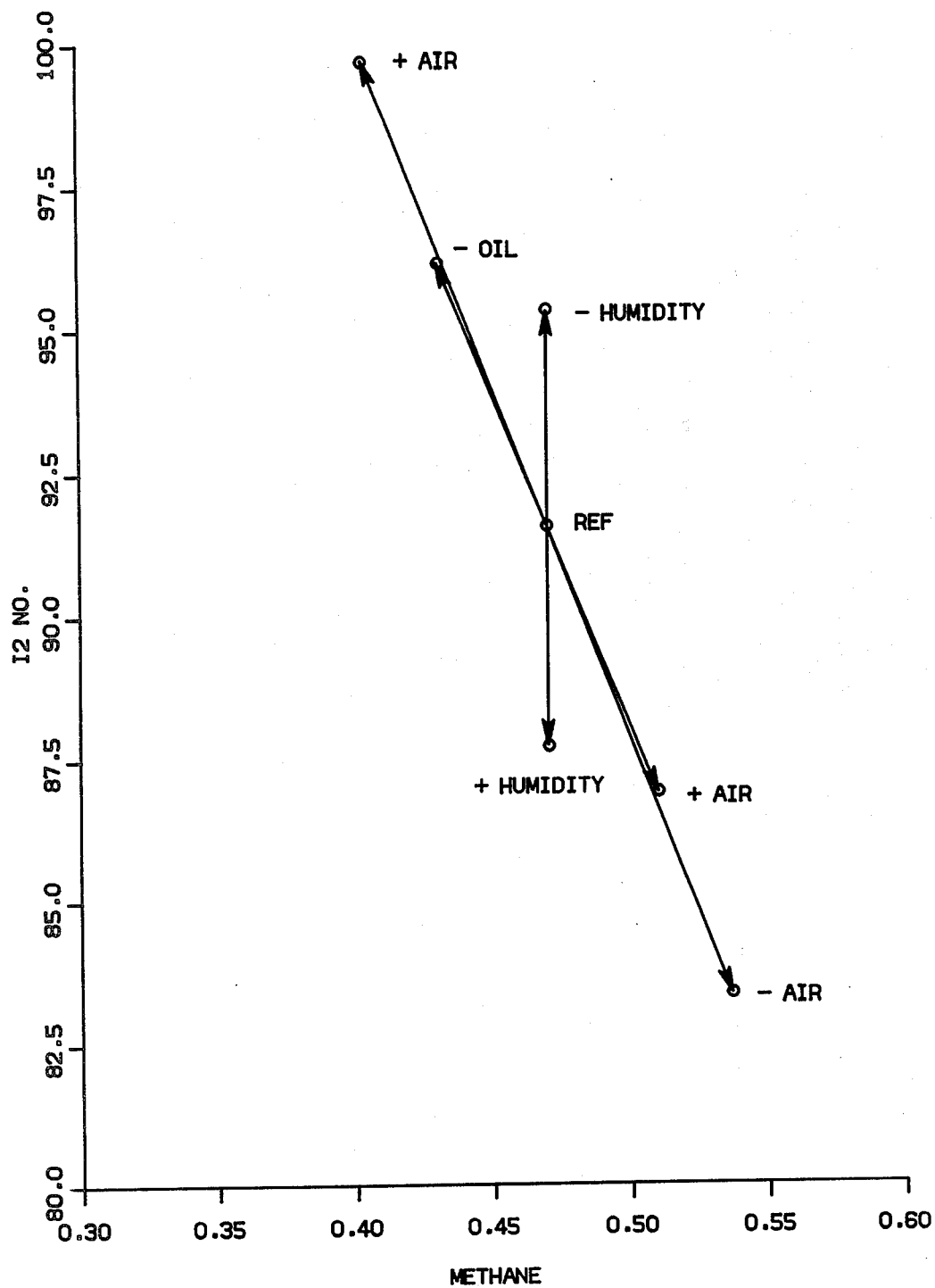
Figure 3:
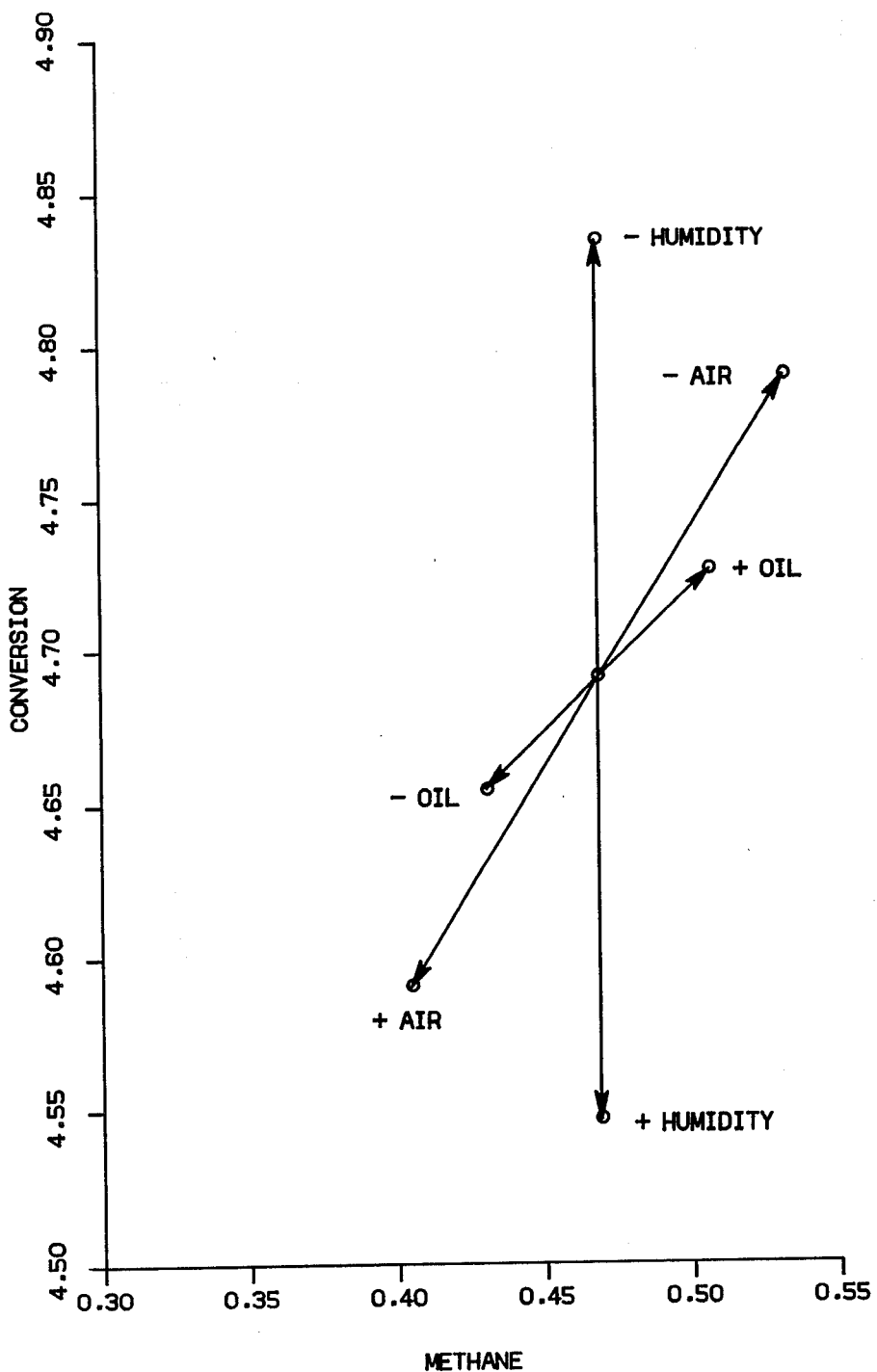
Figure 4:
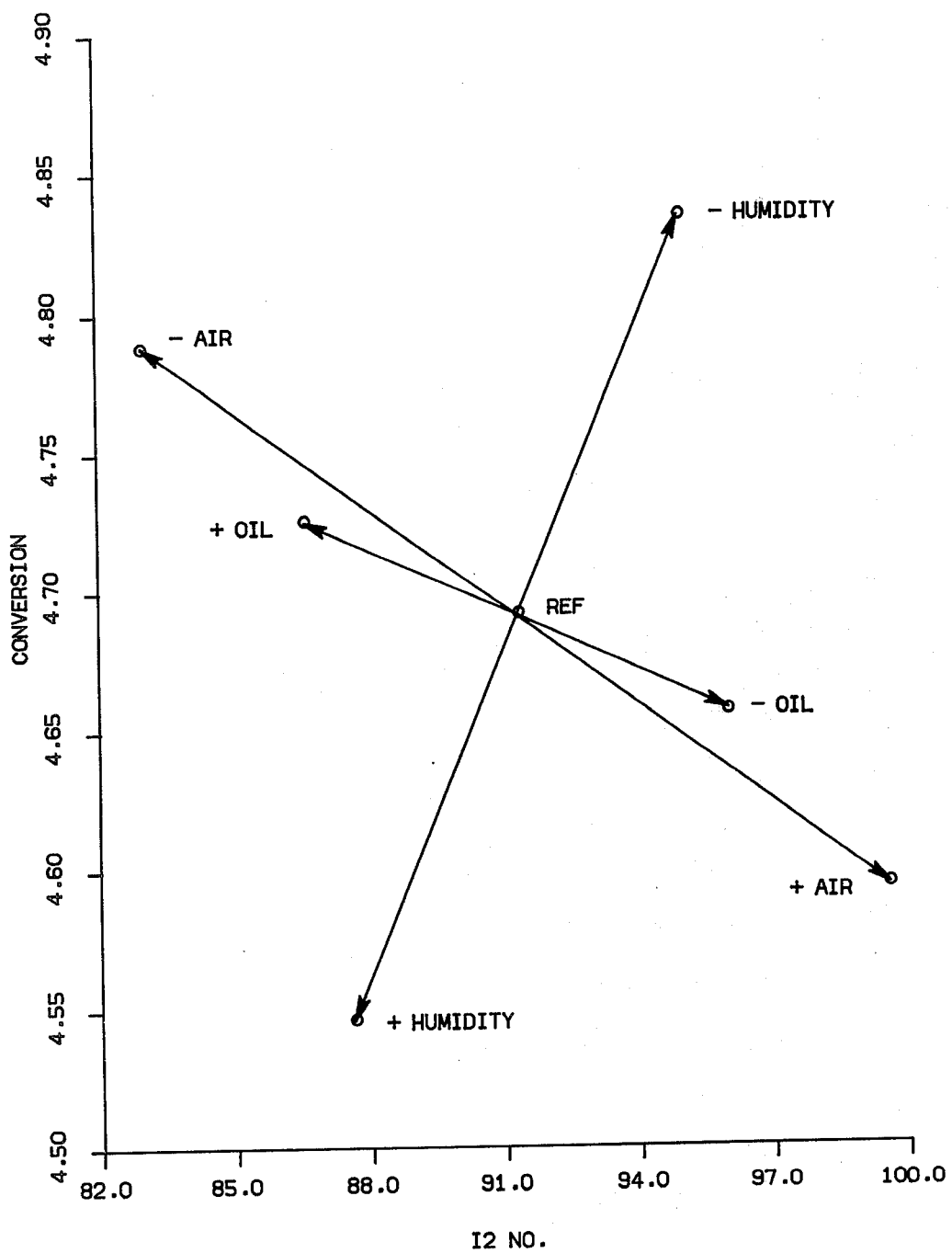

These and other objects, details, features and embodiments of this invention will become apparent to those skilled in the art from the following detailed description of the invention, the appended claims and drawings in which FIG. 1 shows a schematic diagram of a carbon black reactor and the control system of this invention, FIGS. 2-4 show diagrams of the functional relationship between various carbon black process parameters.

In accordance with this invention a control system for a carbon black production operation is provided which calculates, responsive to the determination of the water content of the free oxygen-containing gas used in the process, at least two process parameters that can be manipulated, and the effect of the manipulation of each of these parameters on conversion. The control system then automatically selects that parameter of the carbon black process to be manipulated which, for the corresponding conversion calculation, would result in the largest conversion. The calculation of the process parameters responsive to the humidity for water content determination is carried out such that a preselected carbon black property will remain essentially unchanged despite changes in the water content of the free oxygen-containing gas.

More specifically, this invention in accordance with a first embodiment resides in a process to produce carbon black by the decomposition of a hydrocarbon feed heated to carbon black formation temperature. Such heating is achieved by the combustion of fuel and a free oxygen-containing gas. In the process of this invention, the content of water in the free oxygen-containing gas is automatically determined. At least two control signals, each being representative of one of at least two process parameters which can be manipulated, are then generated responsive to the determination of the water content. The control signals are generated such that the respective manipulation of a corresponding process parameter would counteract the effect any change in the water content as determined would have on a given first carbon black property to keep such first carbon black property essentially constant. A value is then automatically calculated for a further carbon black property for each of said at least two process parameters. Responsive to the results of this calculation, at least one of said at least two control signals is selected for actual control. The process parameter (or parameters) is then manipulated responsive to the thus selected respective control signal (or signals). This control method allows the maintenance of one carbon black property constant while optimizing another carbon black property. Thus, it is for instance possible to maintain the iodine number constant under changing humidity conditions of the free oxygen-containing gas while manipulating either the oil-feed rate or the air-feed rate and to thereby achieve the highest conversion.

The at least two process parameters that can be manipulated preferably are the feed rate of the hydrocarbon feed and the flow rate of the free oxygen-containing gas or both.

The carbon black properties that can be maintained constant or respectively optimized in accordance with this invention include iodine number, surface area, tint, conversion, CTAB, DBP, transmission, and production rate. In the preferred embodiment, the iodine number of the carbon black produced is maintained at a constant value whereas the control is selected such as to achieve the highest conversion rate.

More specifically and preferably, a humidity signal is automatically generated representative of the quantity of water contained in the free oxygen-containing gas which is introduced into the carbon black reactor. This humidity signal is then automatically converted into an oxygen control signal and into a feed control signal. The oxygen control signal is representative of the manipulation of the flow of free oxygen-containing gas required to maintain the selected carbon black property essentially unchanged. Similarly, the feed control signal is representative of the manipulation of the flow of the feed, such as the oil-feed flow rate, required to maintain the carbon black properties essentially unchanged despite a possible variation in the water content of the free oxygen-containing gas. From the oxygen control signal and the feed control signal, a switch signal is automatically generated. This signal is representative of a comparison of two values of a further process parameter such as the conversion rate. These two values have been calculated automatically from the feed rate of the free oxygen-containing gas (as represented by the oxygen control signal) and from the feed flow rate (as represented by the feed control signal). Depending upon which of the two values is the more desirable one for the respective process parameter, the switch signal will be such that it switches to the control of either the flow rate of the free oxygen-containing gas or the flow rate of the feed.

It has to be emphasized, that the process of this invention is preferably applied to a computer controlled carbon black production process. In a computer controlled carbon black production process, a variety of process parameters such as the water content of the free oxygen-containing gas, the feed rate of this gas and its inlet temperature, the feed rate of the hydrocarbon feedstock as well as its inlet temperature, the composition of the feed stream, the position of the feed nozzle within the reactor, the quench rate, the pressure drop across the carbon black reactor (i.e., primarily the inlet pressure of the free oxygen-containing gas), flame temperature and others are measured and entered into the computer either manually or automatically. From such parameters of the process, various control operations are computed and carried out. This invention modifies this general computer control by providing a system which selects automatically one of a plurality of, usually one of two, possible control modes.

Whereas the invention is applicable to a variety of carbon black processes and carbon black reactors, it is presently preferred to use the invention in connection with a carbon black process which uses an oil as the hydrocarbon feedstock and air as the free oxygen-containing gas. In some instances, particularly when larger reactors are used, oxygen enriched air can be the preferred free oxygen-containing gas in the process.

In accordance with a further embodiment of this invention, an apparatus is provided for producing carbon black and for carrying out the control process described. This apparatus comprises a carbon black reactor, a humidity signal generator and an automatic double control unit. The carbon black reactor comprises essentially a cylindrically shaped housing essentially in an axial direction, means for injecting hot combustion gasses obtained by the combustion of fuel and free oxygen-containing gas tangentially into the housing as well as means for withdrawing carbon black containing smoke from the housing. The humidity signal generator is designed to determine automatically the water content in the free oxygen-containing gas and generating a signal representative thereof. The automatic double control unit is operatively connected to the humidity signal generator and the carbon black reactor. The double control unit receives the humidity signal plus signals of other process parameters from the carbon black reactor. The unit is capable of converting this humitidy signal into two control signals; namely, a feed-control signal and an oxygen-control signal. Each of these control signals is computed automatically by the control unit such as to allow manipulation of feed flow or, respectively, flow of free oxygen-containing gas responsive to these control signals in such a way as to keep one carbon black property essentially constant and unchanged despite any changes in the humidity or water content of the free oxygen-containing gas flowing into the carbon black reactor. The double control unit is equipped with a selected means capable of selecting that one of the control signals for the actual manipulation of the respective flow rate which results in a larger conversion of the hydrocarbon feed to carbon black.

A carbon black reactor, together with the main elements of the control system of this invention, is shown in FIG. 1. A hydrocarbon feed is introduced into a carbon black reactor 1 via line 2. Fuel is introduced via line 3 and free oxygen-containing gas, such as air, via line 4. Fuel and free oxygen-containing gas are combusted to form hot combustion gases surrounding the axial stream of hydrocarbon feed in vortex type flow. The carbon black containing smoke is withdrawn from the reactor 1 via line 5.

The flow rate of the hydrocarbon feedstock in conduit 2 can be manipulated by valve 21 and the manipulation of valve 21 can be controlled by controller 22. Similarly, the flow of free oxygen-containing gas can be manipulated by valve 41 which can be controlled by controller 42.

The water content of the free oxygen-containing gas entering the carbon black reactor via line 4 is determined at the location 6. The humidity signal representative of the water content in the free oxygen gas in line 4 is entered into a computer 7. This computer 7 can be a digital or an analog computer but is preferably a digital computer. The computer 7 may encompass controllers 22 and 42 as parts of the computation programs. The units described in connection with computer 7 are portions of computer programs but may also be hardware elements such as special amplifiers in an analog computer or flip flops in a digital computer.

In an iodine model 71, the computer 7 calculates signals $\Delta$AIR, 74, and $\Delta$OIL, 75, based on the humidity signal 6, and iodine number set point, 72, and various other process parameters entered into the computer via 73. The humidity signal, 6, is automatically compared to a reference humidity within the iodine number model, 71. Therefore, the signals $\Delta$AIR, 74, and $\Delta$OIL, 75, are representative of changes in air rate or oil rate required to maintain the iodine number of the carbon black at a desired level despite changes in humidity detected by sensor 6 with respect to the reference humidity. Whether the $\Delta$AIR signal 74 or $\Delta$OIL signal 75 will actually be used in the respective air controller 42 or oil controller 22 is determined by a conversion model 76 and switch unit 77. The conversion model 76 calculates the change in conversion which would be caused by the $\Delta$AIR signal 74 to generate a conversion change signal 761. Similarly, the conversion model 76 calculates a conversion change signal 762 representative of the change in conversion which would be caused by the $\Delta$OIL signal 75. The switch unit 77 is a high-select means which, dependent upon which one of the two signals 761 and 762 is the greater, provides a change in set-point to the respective controller 22 or 42 by allowing the $\Delta$AIR signal, 74, or the $\Delta$OIL signal, 75, to be added to the set-points 24 or 44 respectively. The air rate set-point 24 and the oil rate set-point 44 may be produced in another part of a computer control system or manually input by the operator. Thus switch unit 77 selects whether the air rate controller set-point 23 or the oil rate controller set-point 43 is to be changed to correct for the effect of a change in humidity. Thus, depending upon the calculation of the conversion model 76, the switches 78 and 79 will be in an OFF or in an ON position. When switch 78 is off, switch 79 is on and vice versa. Thus, in this preferred embodiment of the invention, either the hydrocarbon feed-rate or the air-flow rate is manipulated responsive to the humidity determination while the other of the two process parameters is not manipulated responsive to the humidity determination but can be manipulated responsive to other control operations.

In FIGS. 2–4, typical examples of the functional relationship between changes of carbon black process parameters are shown. These figures demonstrate the advantages of this invention. Some attempts have previously been made to try to control a carbon black property, such as iodine number, by measuring a property of the smoke, such as methane concentration. The iodine number is shown in this and all the other figures in units determined by ASTM method D1510-70. Conversion in these and all other figures is expressed in units of pounds of carbon black produced per gallon of oil. Methane concentration is expressed in volume percent. These figures show two significant facts. FIG. 2 shows that for changes in humidity, the iodine number changes significantly but there is no change in methane concentration; therefore, this variable cannot be used as a control variable. Secondly, FIG. 3 shows that while either air rate or oil rate may be manipulated to control iodine number, their effect on conversion is different. Therefore, by selecting the proper variable, a higher conversion may be obtained.

Thus, in FIG. 2, it can be seen that the unit change of humidity shown above causes the iodine number to change from 91.5 to 94.9 for a decrease in humidity and from 91.5 to 88.1 for an increase in humidity whereas the methane content of the off-gas remains unchanged.

A change in air flow rate by the unit given above causes the iodine number to change from 91.5 to 99.4 for an increase in air flow and from 91.5 to 83.5 for a decrease in air flow. The methane content for an increase in air flow changes from 0.471 to 0.412 whereas the methane content for a decrease in air flow changes from 0.471 to 0.530. Similarly, the unit change for the oil flow given above causes the iodine number of the carbon black to change from 91.5 to 86.8 for the case of an increase in oil flow whereas a decrease in oil flow causes the iodine number to change from 91.5 to 96.2. The methane content in the case of increased oil flow changes from 0.471 to 0.510 whereas the decrease in oil flow causes the methane content to change from 0.471 to 0.432.

FIG. 3 in a similar manner shows the effect of the change of the three parameters humidity, air flow and oil flow on the conversion rate (pound/gallon) and the methane content.

FIG. 4 shows the effect the unit changes of the three parameters oil rate, air rate and humidity have on conversion and iodine number. It should be noted that the diagram of FIG. 4 does not contain any additional information over the diagrams of FIGS. 2 and 3 but rather shows part of the respective information in a further diagrammatic representation.

The vectors in FIGS. 2–4, are each three standard deviations of that variable in length ($3\sigma$). This represents the normal variation in these variables observed. For normal carbon black reactors, without computer control, variations for the three parameters are shown in Table 1.

TABLE 1

| Parameter relationship for a typical carbon plant plant | | | | | | | |
|---|---|---|---|---|---|---|---|
| $\Delta$air    = $\pm$5610 SCFH | | | | | | | |
| $\Delta$oil    = $\pm$8.58 GPH | | | | | | | |
| $\Delta$humidity = $\pm$(relative) 1.7% | | | | | | | |
| | Ref. | + $\Delta$Air | − $\Delta$Air | + $\Delta$Oil | − $\Delta$Oil | + $\Delta$Hum. | − $\Delta$Hum. |
| Iodine Number | 91.5 | 99.4 | 83.5 | 86.8 | 96.2 | 88.1 | 94.9 |
| Conversion (lbs/gal) | 4.69 | 4.594 | 4.786 | 4.726 | 4.654 | 4.562 | 4.818 |
| Methane (Vol. %) | .471 | .412 | .530 | .510 | .432 | .471 | .471 |

In the simplest application of the process of this invention, the interrelationship between the above mentioned process parameters of the carbon black process is approximated by a linear relationship. These linear models are generally always of the same form. In particular, the coefficients for the important variables always have the same sign and magnitude. Simple models for iodine number and conversion would be $$I2N\emptyset = A_0 + A_1 \cdot FAIR + A_2 F\emptyset IL + A_3 \cdot AH2\emptyset + \sum_{i=4}^{n} A_i X_i$$

$$XYCC = b_0 + b_1 \cdot FAIR - b_2 \cdot F\emptyset IL + b_3 \cdot AH2\emptyset$$

In these equations, the terms used to characterize the process variables are as follows:
I2NO —Iodine Number (property of carbon black
XYCC—Yield, lb. carbon black/gallon oil
FAIR—Dry air rate, MCFH
FOIL—Oil flow rate, gal/hr.
AH2O—Water flow rate in air, MCFH
$X_i$—Other independent variables cut-off spray position, flame temperature, make-oil spray position, etc.

The coefficients $A_0$—$A_3$ and $b_0$—$b_3$ may be empirically determined by conducting a designed experimental test. The exact form of the model will vary depending on the test design. The models shown above contain only those variables in the control system. Typical values for these coefficients are:

| | |
|---|---|
| $A_0 = -3.0$ | $b_0 = 7.0$ |
| $A_1 = 1.4$ | $b_1 = -0.02$ |
| $A_2 = -0.5$ | $b_2 = 0.004$ |
| $A_3 = -2.0$ | $b_3 = -0.08$ |

Assuming that a change in humidity (AH2O) is counteracted in order to maintain the iodine number by manipulating only the dry air rate FAIR, the following relationship exists:

$$\Delta I2NO = A_1 \Delta FAIR + A_3 \Delta AH2O = 0$$

or $$\Delta FAIR = -(A_3/A_1)\Delta AH2O$$

$\Delta I2NO$—change in iodine number
$\Delta FAIR$—change in dry air flow rate, MCFH
$\Delta AH2O$—change in water flow rate in air, MCFH Similarly, if only the oil flow rate is changed to hold the iodine number constant the following relationship exists:

$$I2NO = A_2\Delta FOIL + A_3\Delta AH2O = 0$$

or $$\Delta FOIL = -(A_3/A_2)\Delta AH2O$$

$\Delta FOIL$ = change in oil flow rate, gal/hr

The conversion model puts the above process parameters into a linear relationship to calculate the conversion of oil to carbon black.

The conversion model of the computer will determine the effect of an air rate change on the conversion as well as the effect of an oil rate change on the conversion. The results of this determination will be:

I. Air Rate $$\Delta XYCC_{AIR} = b_1 \Delta FAIR$$

II. Oil Rate $$\Delta XYCC_{OIL} = b_2 \Delta FOIL$$

Depending upon which of the two conversion changes is larger, the computer will select either $\Delta FAIR$ or $\Delta FOIL$ for the control signal. This can also be expressed as follows:

If $(XYCC_{AIR}.GT.XYCC_{OIL})$ switch (1) = 1. and switch (2) = 0.

If $(XYCC_{AIR}.LT.XYCC_{OIL})$ switch (2) = 1. and switch (1) = 0.

In the above representation, switch = (1) means that the change in the respective set point equals the change signal $\Delta FAIR$ or $\Delta FOIL$ respectively. Switch = 0 means that there will be no change in the respective set point, i.e., the set point of the air flow or respectively the oil flow will remain as prior to the control cycle. GT means greater than and LT means less than.

Reasonable variations and modifications which will become apparent to those skilled in the art can be in this invention without departing from the spirit and scope thereof.

We claim:

1. An apparatus for producing carbon black comprising
   a. a carbon black reactor having
      aa. an essentially cylindrically shaped housing,
      bb. means for introducing hydrocarbon feed at or near the axis of the housing and in essentially the axial direction,
      cc. means for introducing a fuel into said reactor,
      dd. means for introducing a free oxygen-containing gas into said reactor,
      ee. means for introducing hot combustion gases obtained by the combustion of said fuel and free oxygen-containing gas in essentially tangential direction into said housing,
      ff. means for withdrawal of carbon black containing smoke from said housing,
   b. a humidity signal generator for determining the content of water in the free oxygen-containing gas entering the carbon black reactor,
   c. an automatic double control unit operatively connected to said humidity signal generator and receiving said humidity signal, said unit being capable of converting said humidity signal into a feed control signal and into an oxygen control signal, each of said control signals being automatically computed by said unit in such a way that a manipulation of the feed flow or respectively the flow of free oxygen-containing gas responsive to the respective control signal keeps one carbon black property or respectively carbon black process property essentially constant, said unit being further equipped with select means capable of selecting that one of said control signals for a respective manipulation which causes the larger conversion of the feed to carbon black, said double control unit being operatively connected to both a manipulator in the means for introducing hydrocarbon feed and a manipulator in the means for introducng free oxygen-containing gas such as to allow the manipulation of either the hydrocarbon feed or the flow of free oxygen-containing gas into the carbon black reactor responsive to the respective control signal.

* * * * *